Aug. 28, 1956     H. P. LA BORDE     2,760,815
VEHICLE HAVING INDIVIDUAL DUMPABLE CONTAINERS
Filed Feb. 17, 1954     4 Sheets-Sheet 1
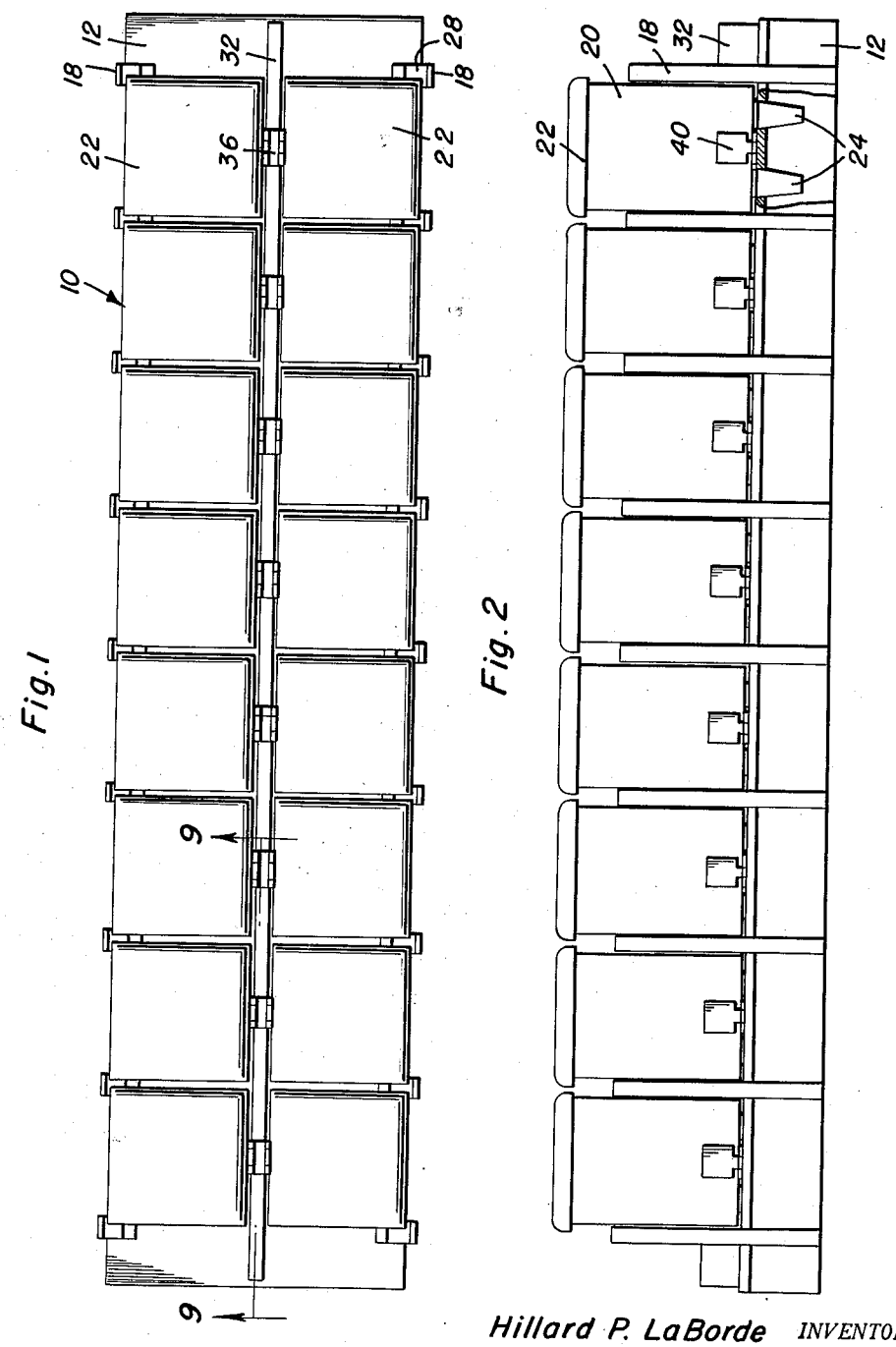
Hillard P. LaBorde INVENTOR.

Aug. 28, 1956     H. P. LA BORDE     2,760,815
VEHICLE HAVING INDIVIDUAL DUMPABLE CONTAINERS
Filed Feb. 17, 1954     4 Sheets-Sheet 2
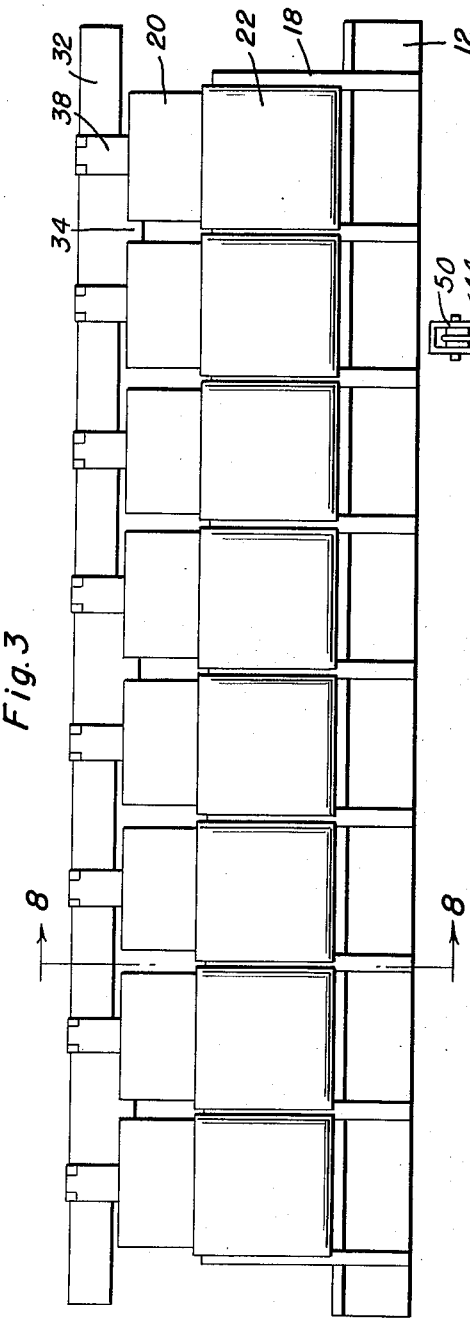
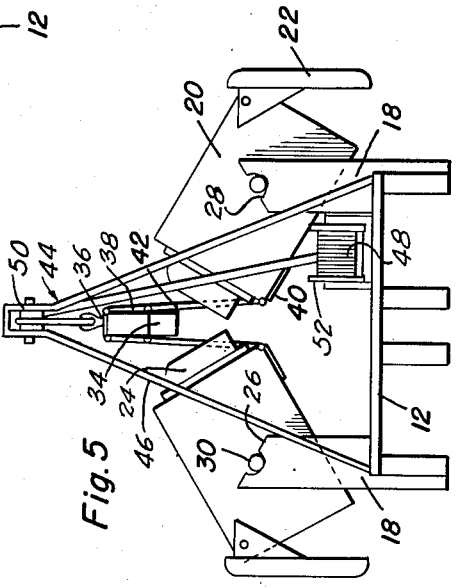
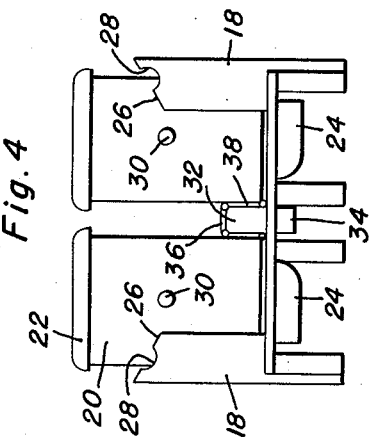
Hillard P. La Borde
INVENTOR.

Aug. 28, 1956  H. P. LA BORDE  2,760,815
VEHICLE HAVING INDIVIDUAL DUMPABLE CONTAINERS
Filed Feb. 17, 1954  4 Sheets-Sheet 3
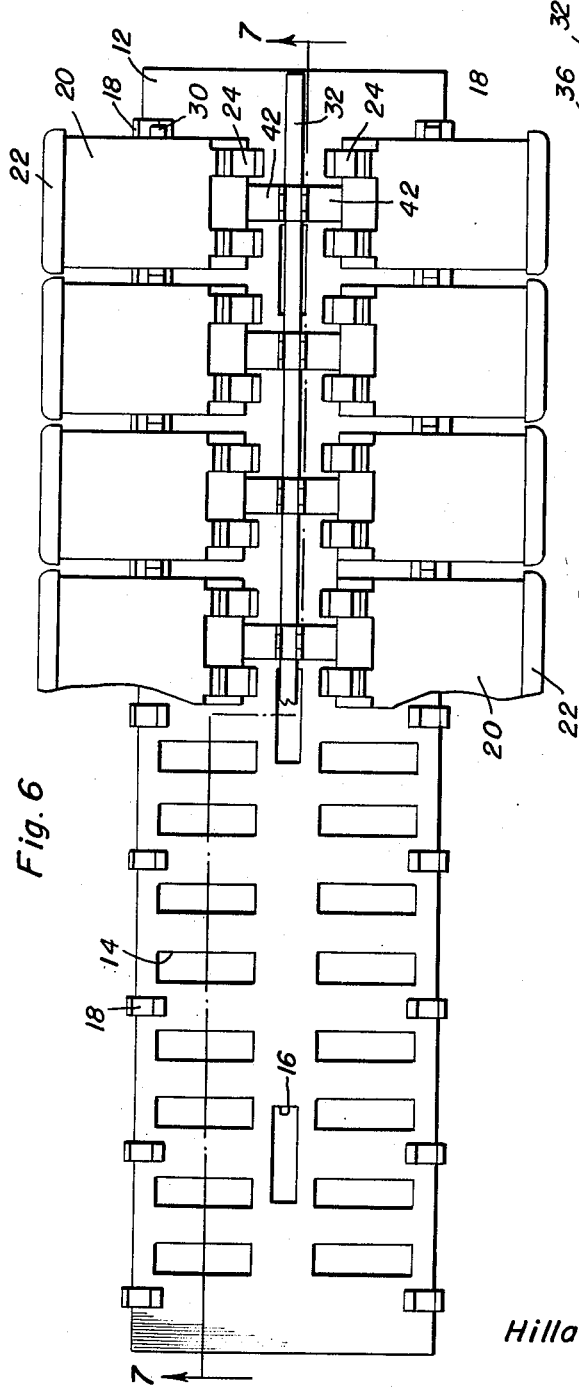
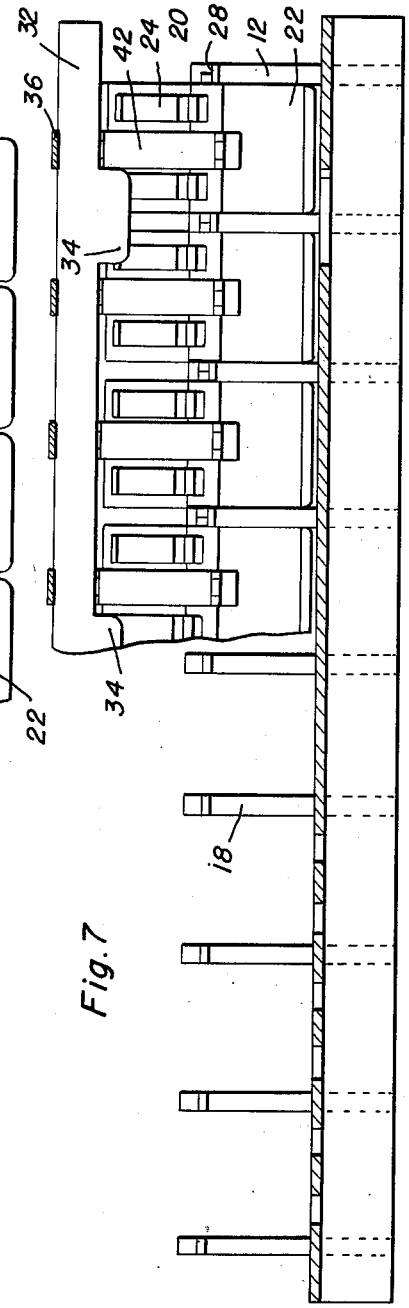
Hillard P. La Borde INVENTOR.

Aug. 28, 1956 H. P. LA BORDE 2,760,815
VEHICLE HAVING INDIVIDUAL DUMPABLE CONTAINERS
Filed Feb. 17, 1954 4 Sheets-Sheet 4

Hillard P. La Borde
INVENTOR.

BY *[signatures]*
Attorneys

United States Patent Office 2,760,815
Patented Aug. 28, 1956

2,760,815

VEHICLE HAVING INDIVIDUAL DUMPABLE CONTAINERS

Hillard P. La Borde, Hawthorn, Pa.

Application February 17, 1954, Serial No. 410,963

6 Claims. (Cl. 298—18)

This invention relates to a vehicle having individual dumpable containers for use in transporting bulk freight such as cement, sand, coal, lime, grain, or packaged freight if desired.

An object of this invention is to provide a vehicle used in transportation wherein the vehicle is provided with individual containers that may be dumped or removed to another transporting vehicle of similar construction thereby facilitating the handling and shipping of freight.

Another object of this invention is to provide a vehicle having novel structural arrangement including a plurality of individual containers that are accurately positioned on a frame for dumping.

Still another object of this invention is to provide a vehicle having individual dumpable containers that is simple in construction, easy to utilize, efficient in operation, and versatile in utility, rugged in construction and economically feasible.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a top plan view of the load carrying frame of a transporting vehicle showing the individual containers of the present invention;

Figure 2 is a side elevation showing the details of construction of Figure 1 with portions thereof broken away for illustrating the locating lugs on the bottom of each container;

Figure 3 is a side elevation similar to Figure 2 with the containers in dumped position;

Figure 4 is an end elevation of the construction of Figure 2;

Figure 5 is an end elevation of the construction of Figure 3 showing the containers in dumped position and the elevating means not shown in other figures;

Figure 6 is a top plan view of the frame with a portion of the containers removed and a portion of the containers in dumped position;

Figure 7 is a longitudinal section taken substantially along section line 7—7 of Figure 6;

Figure 8:
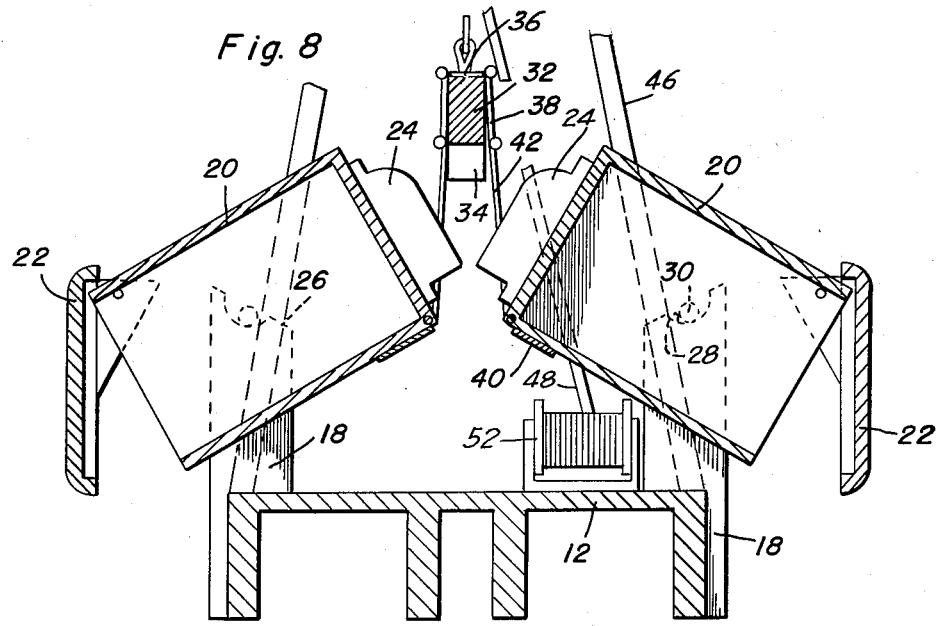
Figure 8 is a transverse vertical section taken substantially along section line 8—8 of Figure 3 showing the containers in dumped positions as moved by the elevating means.
Figure 9:
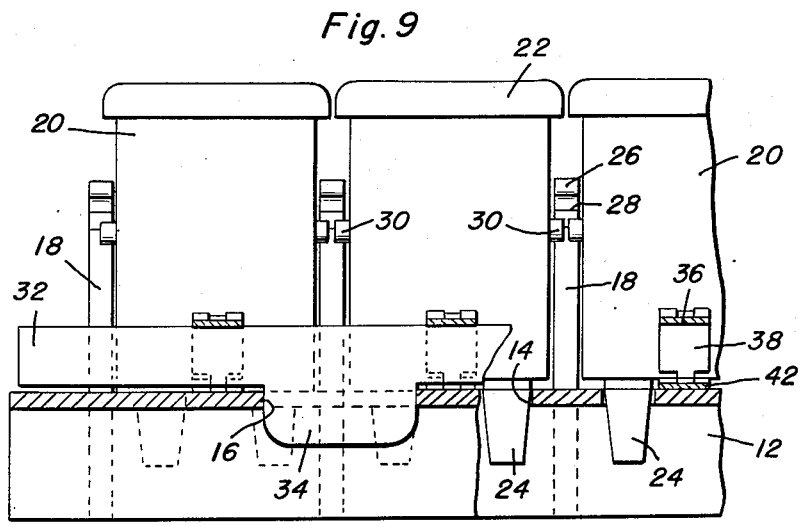
Figure 9 is a detailed section taken substantially along section line 9—9 of Figure 1 showing the details of construction of the pivot pin projecting from the sides of each container.

Referring now specifically to the drawings, it will be seen that the numeral 10 generally designates the vehicle of the present invention having a plurality of individual dumpable containers. The vehicle may be any mobile device utilized in transportation such as a truck, railroad car or the like. And the present invention is especially useful in transporting bulk freight and will generally replace the hopper-type cars now utilized for this purpose.

The vehicle 10 of the present invention includes an elongated frame 12 having two rows of longitudinally aligned apertures 14 polygonal in shape. The apertures 14 are longitudinally aligned and longitudinally spaced and transversely aligned and transversely spaced for a purpose described hereinafter. Along the longitudinal center line of the frame 12 is a plurality of apertures 16 for a purpose described hereinafter. The long axis of the apertures 14 extends transversely and the long axis of the apertures 16 extends longitudinally of the frame 12 with the apertures 16 being positioned on the longitudinal center line of the frame 12 and the apertures 14 equally spaced therefrom.

A plurality of upstanding brackets 18 are provided along each longitudinal edge of the frame 12 and are disposed between every other aperture 14. In other words, an upstanding bracket 18 is spaced from the next adjacent upstanding bracket 18 by two of the apertures 14 for a purpose described hereinafter. Positioned between each of the brackets 18 is a receptacle 20 having a pivotally mounted closure 22 on the upper end thereof and a pair of depending lugs on the lower end thereof. The depending lugs 24 are generally enlarged and are received in a pair of the apertures 14 for correctly positioning the receptacle 20 between the upstanding brackets 18.

As specifically shown in the drawings, each of the upstanding brackets 18 is provided with an upwardly and outwardly inclined upper surface 26 having a semi-circular groove 28 positioned thereon for receiving a pivot pin which projects from each side wall of the receptacle 20. It will be seen that by positioning the pivot pin in the groove 28, the receptacle may be pivoted about the axis formed thereby to a dumped position substantially as shown in Figure 8.

An elongated beam 32 is provided along the longitudinal axis of the frame and includes depending lugs 34 along the lower surface thereof for reception in the aperture 16 thereby positioning the beam 32 along the longitudinal axis of the frame 12. Secured to the upper surface of the beam 34 is a plate 36 and it will be seen that a plurality of the plates 36 is disposed along the beam 32 with each of the plates being positioned substantially at the transverse center line of a pair of containers 20.

Each of the plates 36 is secured to the upper surface of the beam 32 by suitable fastening means such as welding and a pair of plate links 38 are secured thereto with a plate link 38 being pivotally secured to each end of the plate 36. Secured to the outer lower end of each container 20 is a mounting plate 40 and a connecting plate 42 pivotally interconnects the lower end of the link plate 38 and the mounting plate 40 thereby forming a flexible connection between the container 20 and the beam 32. It will be seen that the length of the connecting plate is substantially the same as the length of the bottom of the container 20 and when the containers 20 are in their vertical or loaded position, the beam 32 is closely received between the inner edges of the containers 20.

The operation of the device will be readily understood. The frame 12 is positioned on or is an integral part of the construction of a vehicle frame utilized in transportation such as a truck or railroad car. A plurality of containers 20 is placed on the upper surface of the frame 12 with the depending lugs 24 positioned in the apertures 14. The apertures 14 act as a positioning means for locating the containers 20 in their positions when the containers are dumped or are removed and replaced on the frame 12. Normally, the containers 20 are vertically disposed on the frame 12 with the pivot pin 30 positioned alongside the bracket 18 substantially as shown in Figure 4.

The lifting beam 32 is positioned between the adjacent containers 20 and fits snugly therebetween and a lifting hoist generally designated by numeral 44 is provided for lifting the beam 32. The hoist 44 includes an inverted V-shaped bracket 46 at each end of said frame 12, a flexible cable 48 over a pulley 50 at the apex of each bracket 46, and a winch 52 on said frame 12 for raising and lowering the beam 32 and provided with power by a power source (not shown)). As the beam 32 lifts, the plate 36 along with the link plates 38 and the connecting plates 42 lift the containers 20 upwardly and pivots them outwardly as the force is directed against the mounting plate 40 on the outer edges of the containers 20.

Under the action of the beam 32 and the mounting plate 40, the containers 20 are lifted and pivoted outwardly until the pivot pins are disposed in the grooves 28 on the upper inclined end 26 of the vertical brackets 18. When the pivot pins 30 are disposed in the grooves 28, the containers 20 are pivoted to a dumping position substantially as shown in Figure 5 wherein the pivotal closure automatically is in an open position thereby permitting the contents of the containers to be dumped.

As the beam 32 is lowered, the containers 20 pivot about the pin 30 until the depending lugs engage the outer edges of the apertures 14 wherein the combined action of the downward movement of the containers 20 and the inward movement against the outer edges of the apertures 14 will urge the pins 30 from the groove 28 wherein the bottom of the containers 20 is supported flush against the upper surface of the frame 12. The depending lugs 34 on the elongated beam 32 correctly position the beam 32 between the receptacles 20 thereby facilitating the correct position of the beam 32.

Obviously, it will be seen that the upper plate 36 may be detachably connected to the beam 32 wherein suitable lifting hoists may be utilized for removing the container 20 even in a loaded condition or an unloaded condition by engaging the pivot pin 30 if desired.

The construction of this invention may be utilized in conjunction with as many containers as desirable disposed in double rows or single rows and may be simultaneously dumpable. Further, it will be understood that the containers may be removed from the frame 12 for dumping or loading and replaced thereon or if desired the containers may be lifted from a frame 12 which may be an element of a freight car and lifted to a frame 12 which may be an element of a truck thereby facilitating the shipment of bulk freight.

It will be understood that the frame 12 must be spaced from the supporting surface a distance in order to accommodate the downwardly projecting lugs 24 on the containers 20 and the projecting lugs 34 on the beam 32. The device is especially useful in handling materials such as gravel, coal, sand, lime, or the like and may be utilized in various types of packaged freight. It will be understood that the containers may be utilized in transporting liquids and may be adapted for transporting molten metal during the changes from one process to another in a steel plant.

It will be seen that the various elements of the device are constructed of simple and rugged members, thereby enhancing the economic feasibility and ease of operation of the device.

From the foregoing, the construction and operation of the device will be readily understood and further explanation is believed to be necessary. However, since numerous modifications and changes will occur to those skilled in the art, and it is not desired to limit the invention to the exact construction shown and described, accordingly, all suitable modifications and equivalents may be resorted to, falling within the scope of the appended claims.

What is claimed as new is as follows:

1. A vehicle having a plurality of individual containers comprising a frame, a plurality of containers positioned on said frame, means positioning said containers on said frame, means forming a pivot axis for said containers, and means for moving said containers about said pivot axis for dumping said containers, said pivot forming means including an upstanding bracket positioned on each side of each container, said bracket having an inclined upper end portion, a notch in said upper end portion, and a pair of oppositely extending pins on each of the containers for engagement with the notches thereby pivotally mounting said containers when they are tilted to a dumping position.

2. The structure as defined in claim 1 wherein said moving means includes a plate secured to the lower outer edge of each of the containers, and means associated therewith for lifting and pivoting said containers to a dumping position.

3. The structure as defined in claim 2 wherein said lifting means includes an elongated beam, and a pair of links interconnecting said beam and mounting plate on each of the containers thereby moving the containers to a dumping position when the beam is raised vertically.

4. A transporting vehicle comprising an elongated polygonal frame, a pair of rows of apertures in said frame, said apertures being transversely and longitudinally aligned and spaced and positioned adjacent the longitudinal edges of the frame, a pair of rows of containers positioned on said frame, a pair of depending lugs on each container for projecting through adjacent apertures and positioning the containers on the frame, an upstanding bracket disposed on each side of each container, each of said brackets having an outwardly and upwardly inclined upper end with a notch centrally disposed in the upper end, a pin projecting from each side of each container, said pins being disposed below and spaced inwardly from the brackets when the containers are positioned on the frame, and means for lifting and tilting the containers to engage the pins in the notches thereby forming a pivot axis for the pivotal movement of said containers.

5. The structure as defined in claim 4 wherein each of said containers is provided with pivotally mounted closures that automatically open and close when the containers are moved vertical and dumping positions.

6. A material transporting device comprising a frame, a container supported on said frame, means for positioning said container on said frame, means forming a pivot axis for said container, and means for tilting the container about the pivot axis for dumping the container, said pivot axis forming means including a pair of oppositely disposed outwardly extending pins on said container, an upstanding bracket on each side of said container with the brackets being connected to said frame, each of said brackets having an inclined upper end with a notch disposed therein for receiving said pins and forming a pivot axis for said container, said pins being normally out of engagement with the notches and disposed adjacent the lower end of the inclined upper end of the brackets whereby tilting of the container will cause movement of the pins into the notches for forming a pivot axis whereby none of the weight of the container and material is supported by the brackets when the material is being transported.

References Cited in the file of this patent
UNITED STATES PATENTS

| Number | Name | Date |
|---|---|---|
| 717,293 | Smith | Dec. 30, 1902 |
| 825,106 | Bradley | July 3, 1906 |
| 885,162 | Kirchner | Apr. 21, 1908 |
| 998,432 | Walker | July 18, 1911 |
| 1,772,939 | Fitch | Aug. 12, 1930 |
| 2,620,748 | Shields | Dec. 9, 1952 |